United States Patent
Herman

(10) Patent No.: US 7,039,570 B2
(45) Date of Patent: May 2, 2006

(54) FLEXOGRAPHIC SIMULATOR AND DIAGNOSTIC SYSTEM

(75) Inventor: Peter Q. Herman, Antony (FR)

(73) Assignee: Sinapse Graphic International, Saint-Aubin (FR)

( * ) Notice: Subject to any disclaimer, the term of this patent is extended or adjusted under 35 U.S.C. 154(b) by 775 days.

(21) Appl. No.: 09/773,560

(22) Filed: Feb. 2, 2001

(65) Prior Publication Data
US 2001/0034592 A1   Oct. 25, 2001

Related U.S. Application Data

(60) Provisional application No. 60/180,163, filed on Feb. 4, 2000.

(51) Int. Cl.
*G06G 7/48* (2006.01)
(52) U.S. Cl. .......................................... 703/7; 700/128
(58) Field of Classification Search .................. 700/83, 700/127, 128; 702/137, 182, 183; 345/695; 365/700; 715/517, 526, 529, 530; 703/7
See application file for complete search history.

(56) References Cited

U.S. PATENT DOCUMENTS 4,639,881 A * 1/1987 Zingher ...................... 345/839
5,027,293 A * 6/1991 Pung et al. .................. 702/185
5,434,961 A * 7/1995 Horiuchi et al. ............. 715/507
5,551,011 A * 8/1996 Danby et al. .................. 703/6
5,773,634 A * 6/1998 Chess et al. ................. 549/529

OTHER PUBLICATIONS

Curran et al., T. Simulation Case Studies in the Print/Finish Industry, Proceedings of the 30th Conference on Winter Simulation, Dec. 1998, pp. 1501-1504.*

* cited by examiner

*Primary Examiner*—Russell Frejd
(74) *Attorney, Agent, or Firm*—Dickstein Shapiro Morin & Oshinsky LLP

(57) ABSTRACT

A flexographic printing press simulation application provides virtual control of various types of flexographic printing presses. Running on an industry standard personal computer, the simulation application allows a user to modify a wide variety of printing process parameters and view the printed results. Process parameters and values can be adjusted for each component of the printing press, as well as for the materials utilized. The print images generated by the simulator reflect the parameter changes as they happen, and can be compared to a "proof" in real time using built-in virtual diagnostic tools. A training module provides for the creation of training curricula based on a library of printing process problems.

22 Claims, 24 Drawing Sheets

FIG. 6

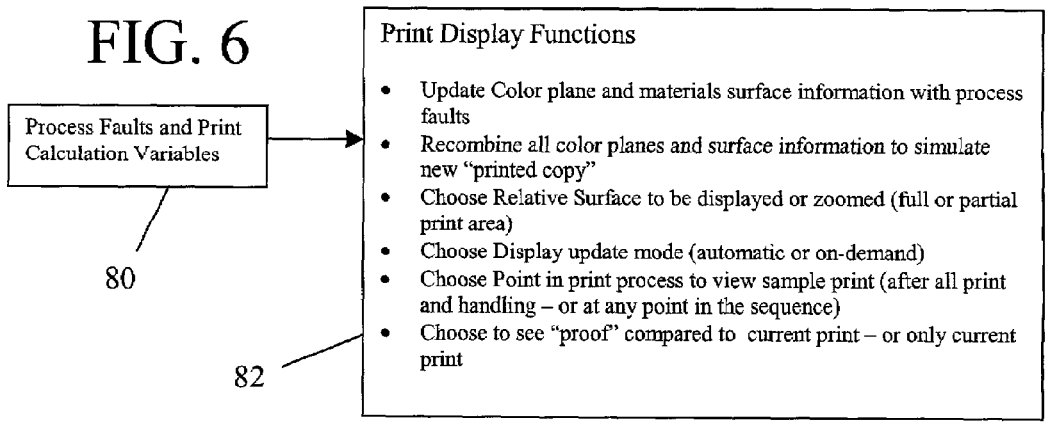

Print Display Functions

- Update Color plane and materials surface information with process faults
- Recombine all color planes and surface information to simulate new "printed copy"
- Choose Relative Surface to be displayed or zoomed (full or partial print area)
- Choose Display update mode (automatic or on-demand)
- Choose Point in print process to view sample print (after all print and handling – or at any point in the sequence)
- Choose to see "proof" compared to current print – or only current print

FIG. 7

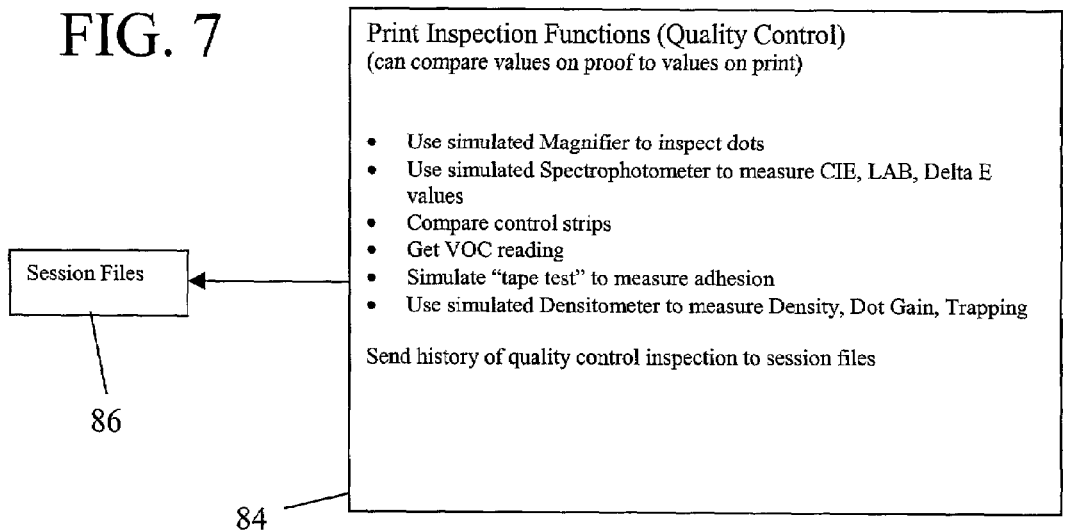

Print Inspection Functions (Quality Control)
(can compare values on proof to values on print)

- Use simulated Magnifier to inspect dots
- Use simulated Spectrophotometer to measure CIE, LAB, Delta E values
- Compare control strips
- Get VOC reading
- Simulate "tape test" to measure adhesion
- Use simulated Densitometer to measure Density, Dot Gain, Trapping Send history of quality control inspection to session files

Control Panel Interaction (see samples from Different Press Types)
1. Choose Control Function (eg. Speed, temperature, tension, pressure, ink values, ..
2. Choose type of interaction
3. Enter Value
4. Send new values to simulator- receive new display information from Simulator
5. Consult "Job ticket" – compare to current values
6. Access first level of diagnostic information

Press Component Interaction (see samples)
1. Access Component
2. Choose Subcomponent(s)
3. Choose type of interaction (check, act)
4. Verify Information -> interaction with process value data base
5. Change press values – send new values to simulator (variable, new values, cost and time information)
6. Access multimedia links
7. Create new multimedia links

178

182  180  184

186

188

196

198

200

202

FLEXOGRAPHIC SIMULATOR AND DIAGNOSTIC SYSTEM

This application claims the benefit of U.S. Provisional Application Ser. No. 60/180,163, filed Feb. 4, 2000.

BACKGROUND OF THE INVENTION

1. Brief Description of the Invention

The present invention relates to a computer simulation program for modeling a flexographic printing process. More specifically, the present invention relates to a series of computer program modules that simulate the operation and output of various flexographic printers through the use of formal database models based on materials and process information variables obtained through a user interface.

2. Field of the Invention

Flexography is a complicated printing process using flexible "plates" to transpose an inked imaged onto different substrates. Ordinarily, years of training and experience are required in order to become proficient in operating flexographic printing presses. It would be desirable to provide a flexographic printing press simulator for purposes of training new operators, and for assisting skilled operators in diagnosing printing problems.

SUMMARY OF THE INVENTION

The present invention provides a flexographic printing simulator which gives the user "hands-on" experience in recognizing, analyzing, measuring and correcting production problems within the printing process. Complex process models and sophisticated display routines simulate the printing process and the resulting printed product, allowing the user to see and correct the virtual product when things go wrong (or right) without incurring the time and expense of using an actual press.

There are several modules in the functional architecture:

1. A set of Data Bases (upstream of the actual programs) which contain a formal model of the process variables, their range of potential values, their potential interaction with each other and the effect their potential dysequilibria may have on the process output.

2. A User Interface which simulates a pressroom (several pressrooms are modeled), the printing and control systems in this pressroom. The interface lets a user verify and act on press and process parameters. These actions and verifications are communicated to the simulator, and produce various trace files for later examination. The user interface is structured to allow integration by the user of multimedia links so that video, text, photo, html files, etc. can all be hooked to any part of the simulated pressroom. This allows the users to personalize an otherwise "generic" image.

3. A Simulator program which is a dynamic model of the printing process. It takes a predefined process state (correct or incorrect), propagates the information through the topological relations of the variables and, depending on the resulting values, may change the appearance of the simulated print copy. These changes of state may also result in messages or new values being displayed on the user interface or written into the trace files. The simulator architecture has been designed so that the computer interface (User Interface) can be replaced or supplemented by a direct connection to the press console (one step closer to a real "cockpit").

4. A "Copy Desk" (so called because that is where a printer often spreads out the print to check its quality). A very complex set of software routines performs image manipulations in order to reproduce the "printed" effects on the copy. These can include changes in the size of the "dots" or in their "density" (the thickness of the ink film), modifications to the substrate surface (wrinkling, creasing, tears), etc. This software also simulates a printer's diagnostic tools: densitometer, magnifier, spectrophotometer—giving the simulated values or providing the simulated magnification of the fault.

5. A "Trainer Module" allows a user to specify the sets of materials that they use, the "reference values" which give good results in production. The simulator then uses these values to define the "equilibrium" for the production run and any divergence from these values may (depending on its intensity) produce problem states in the simulated process and may result in "bad print". The user can also define production costs which are then applied in the simulator so the trainees can track the economic consequences of their actions. The trainer module also permits the user to create problem sets which become the curriculum of a training course. The fact that the user can input their "production values" means that the trainee gets used to the "right numbers".

6. A "Copy Generator" allows users to enter their own images as simulated production jobs. This makes the training experience more real as the trainees are working with real-world print jobs—the same ones they see in their pressroom. This module analyzes the image and pre-calculates how certain faults would look if they were to appear on this image. For example, some faults are linked to areas of very heavy color—these areas must be recognized and a set of faults (depending on the intensity of the fault which arrives) will be generated and stored for later use.

7. A Diagnostic Help System. This system presents the databases in a way intended to help users troubleshoot print problems. This help system can run as a "standalone" product and can be embedded into production consoles and interfaced with process control data. The data is structured in causal layers when viewed from the "fault" perspective. When viewed from the machine component perspective, the data is presented as a component/subcomponent hierarchy, with each element in the hierarchy having a set of associated variables. Each of these variables is linked to its potential values and the print faults which may result if these values are not normative.

Other features and advantages of the present invention will become apparent from the following description of the invention which refers to the accompanying drawings.

BRIEF DESCRIPTION OF THE DRAWINGS

FIG. 6 is a flowchart illustrating the print display functions of a flexographic printing simulator according to the present invention.

FIG. 7 is a flowchart illustrating print display inspection/quality control functions of a flexographic printing simulator according to the present invention.

FIG. 8 is a flowchart illustrating user interface routines of a flexographic printing simulator according to the present invention.

DETAILED DESCRIPTION OF THE PREFERRED EMBODIMENTS

Figure 1:
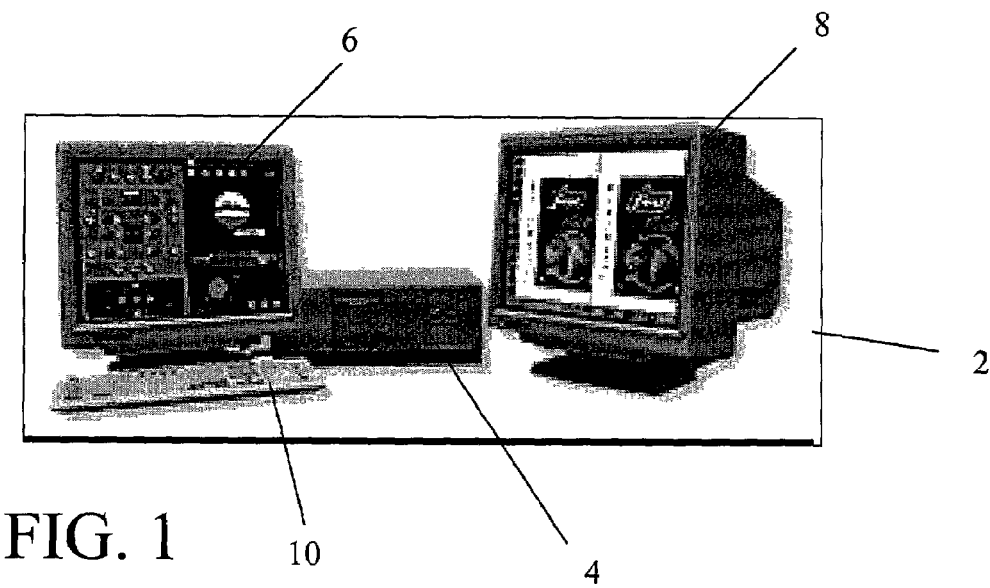
FIG. 1 illustrates an implementation of the flexographic simulator of the present invention provided on a computer system with two display monitors.

FIG. 1 illustrates a recommended configuration for invoking the flexographic printing simulator of the present invention on a computer system 2 equipped with desktop workstation 4 supporting dual monitors 6 and 8. A keyboard 10 and a mouse (not shown) typically are provided for user input and control. As shown in FIG. 1, the left hand monitor 6 displays a "pressroom user interface", and the right hand monitor 8 displays the "Print Display", as discussed in greater detail below. Typically, the computer system includes a multimedia PC with a special graphics card (e.g., MATROX 450 Twin head) that manages a dual-monitor display. The simulator also can run with only a single monitor, in which case the user would switch between the various available displays.

Figure 2:
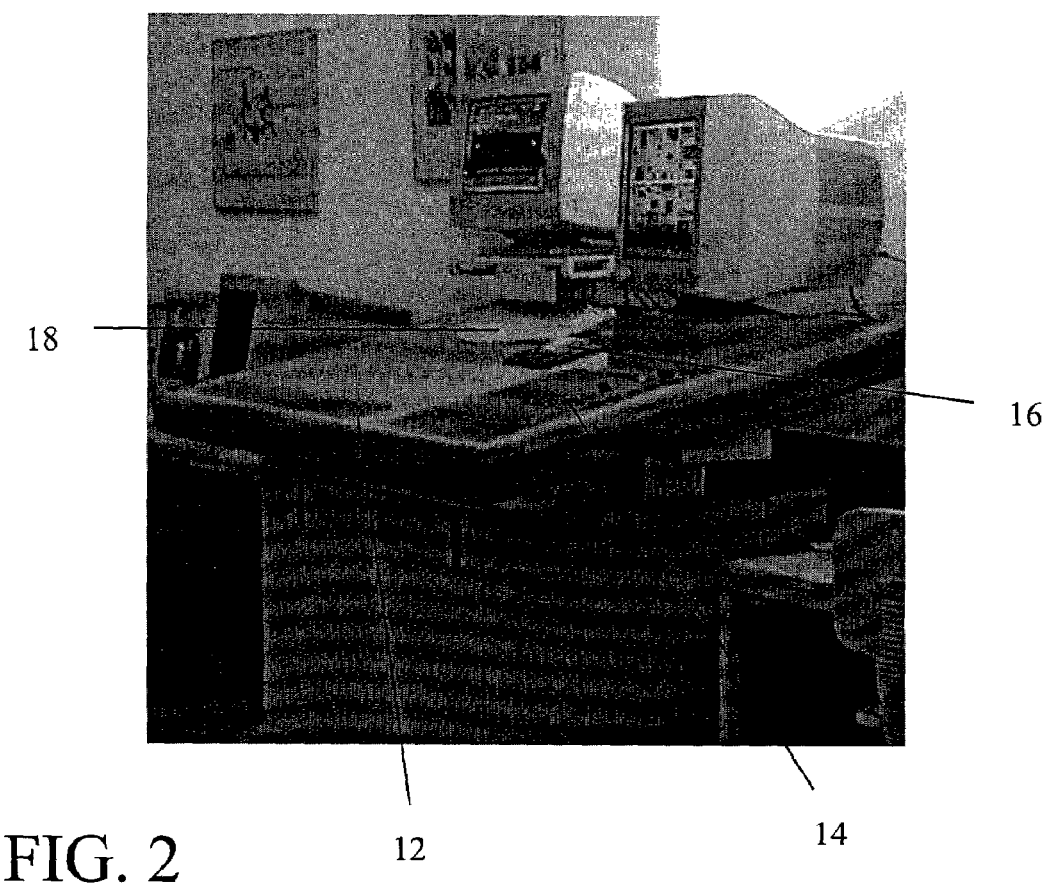
FIG. 2 illustrates an implementation of the flexographic simulator integrated into a press control console simulator according to an embodiment of the present invention

FIG. 2 illustrates an alternative implementation of the present invention, in which the simulators can also be integrated into a press control console 12. In this case the user "drives" a virtual (simulated) press from the normal console controls 14, with only occasional use of mouse 16. A keyboard 18 also is available for user input and control.

The flexographic simulator of the present invention can run on various computer systems as are known to those of skill in the art and generally available. For example, the simulator can run on a standalone industry standard personal laptop or desktop computer, or in a distributed environment over a local or wide area network. Recommended capabilities for the computer system include a Pentium®-grade or compatible central processing unit running at 200 MHz or higher, with 64 MB of RAM and a 2 GB hard drive. A typical operating system would include Microsoft® Windows 95/98, for example. Also recommended are a Microsoft® compatible mouse, a CD Rom drive, a diskette drive, sound card and speakers, and a video graphics card and monitor(s) as required by the type of configuration to be implemented. In addition, access to the Internet and an Internet browser are recommended to enable downloading of software revisions and upgrades, for example.

Figure 3:
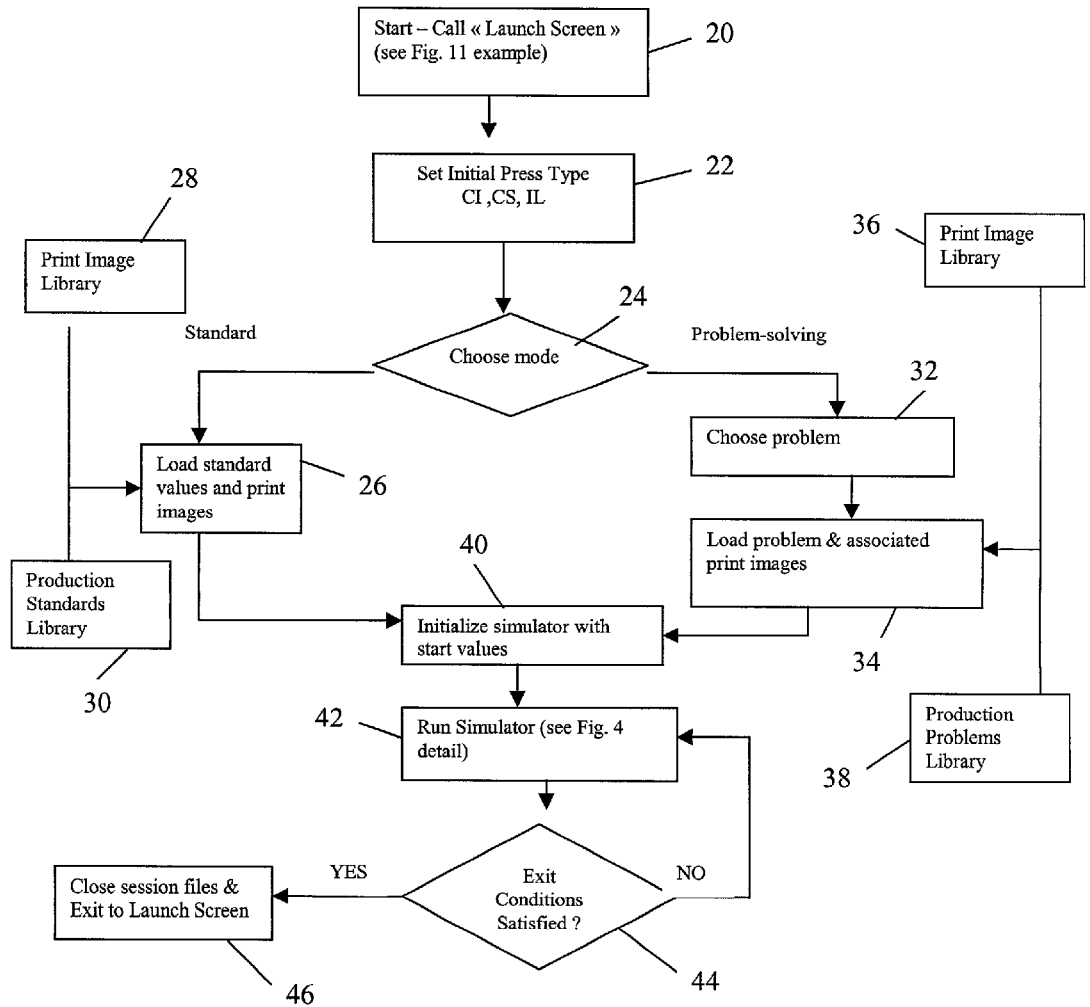
FIG. 3 is a flowchart illustrating the overall flow of the flexographic printing simulator according to the present invention.
Figure 11:
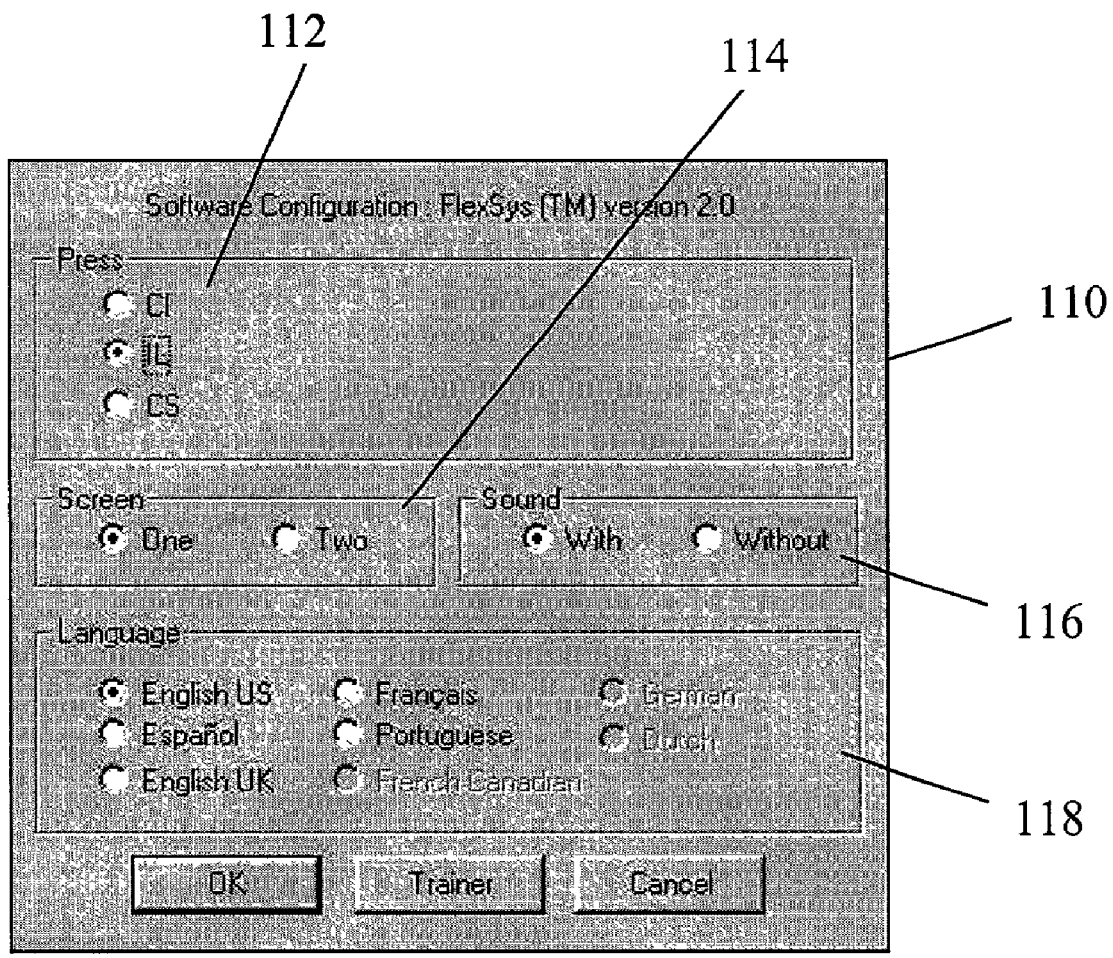
FIG. 11 illustrates a computer screen graphic for user configuration of a press selection in a flexographic printing simulator according to the present invention.
Figure 25:
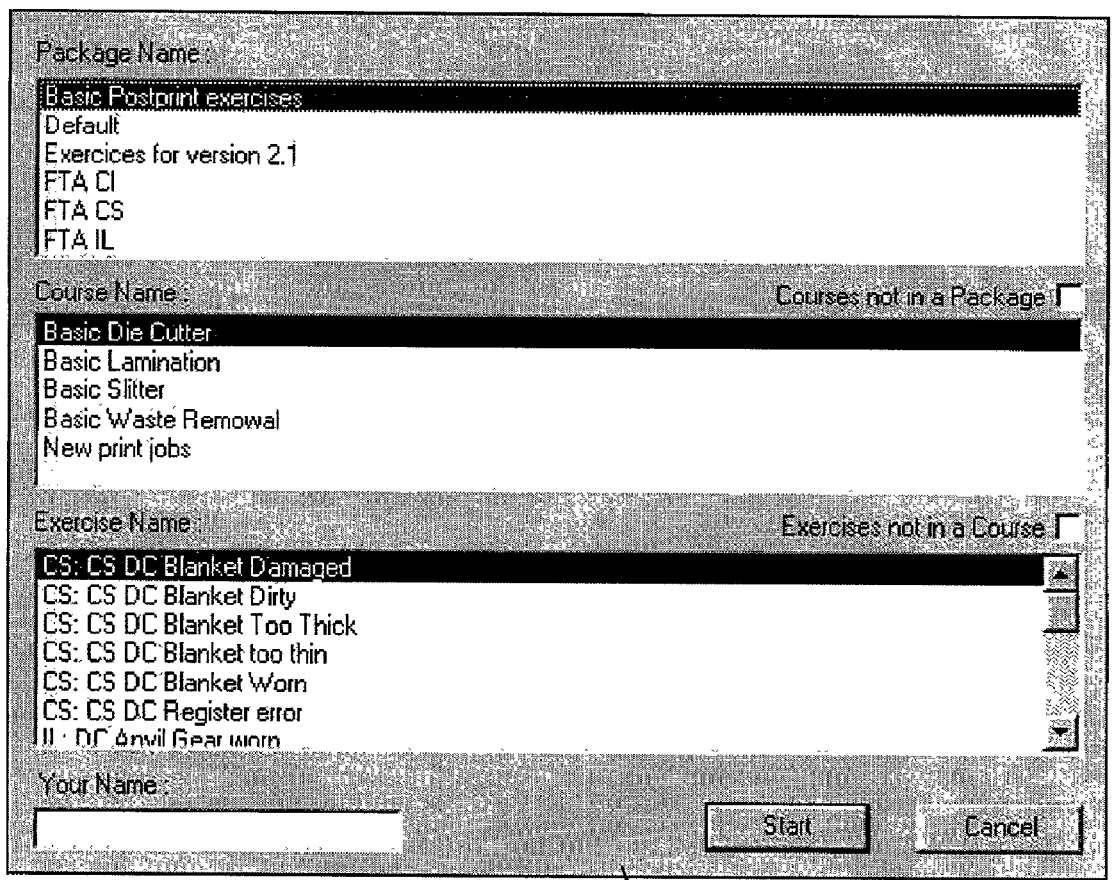
FIG. 25 illustrates a predefined library of process problems for use with a flexographic press simulator according to the present invention.

The flowchart of FIG. 3 illustrates the overall organization of the flexographic printing simulator computer program of the present invention. Initially, a Launch Screen is presented to a user, and from there the user can begin configuring the software application by selecting an initial press type in block 22. A typical software configuration screen is shown in FIG. 11. Configuration options include a Common Impression (CI) press, a Corrugated Stock (CS) press, and an In Line (IL) press. These and other options will be explained in further detail below. Once the initial press type is selected, the user has a choice of modes at block 24, such as Standard operating mode or a Problem-Solving mode. In the standard mode, the simulator loads a selected set of values and images at block 26 from library databases 28, 30 into the simulator for execution. In the Problem-Solving mode, training exercises choices are available 32 to be loaded 34 from libraries of print images 36 and production problems 38, challenging the user to correct the problems by adjusting various operating parameters. An example of a predefined process problem selection screen is shown in FIG. 25. Once the selected mode has been established, the simulator is initialized with starting values 40 and the simulator runs 42. Upon satisfying required exit conditions 44, the session files are closed and the simulator returns to the Launch Screen 20.

Figure 4:
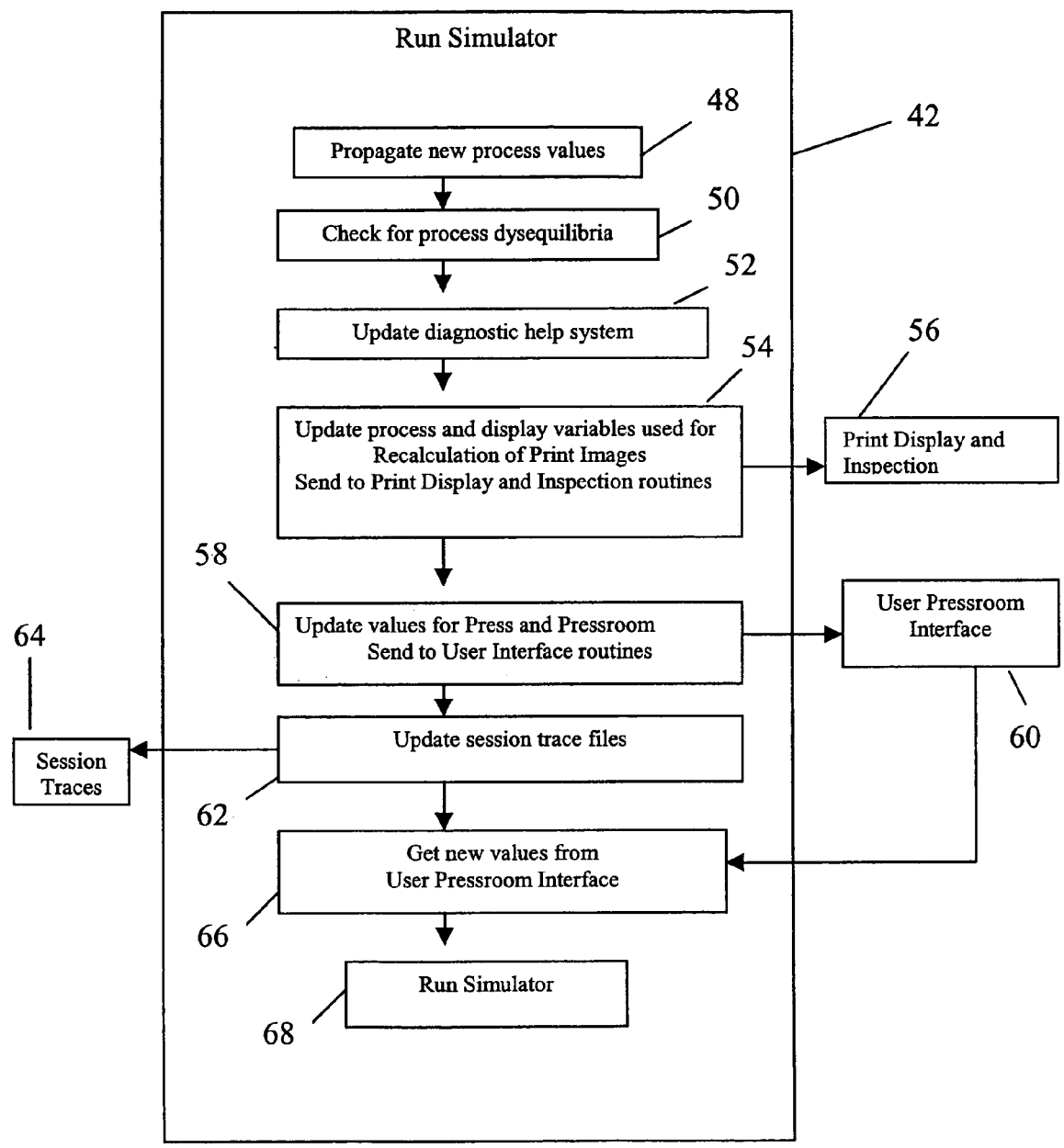
FIG. 4 is a flowchart illustrating detailed steps in the operation of the flexographic printing simulator of the present invention.

FIG. 4 is a flowchart showing in greater detail the steps involved in running the simulation at block 42 of FIG. 3. The system initially propagates new process values 48, and checks for process disparities and imbalances 50. The diagnostic help system is updated 52 with the new information, as well as the process and display values 54. The resulting print images are generated and sent to Print Display and Inspection 56. Updated values for Press and Pressroom routines 58 are sent to the User Pressroom Interface 60. A record is kept of each session 62 to provide a trace 64 of the process for diagnostic and learning purposes. Values updated through the user Pressroom Interface 60 are obtained at block 66, as necessary, and a simulation is performed 68.

Figure 5:
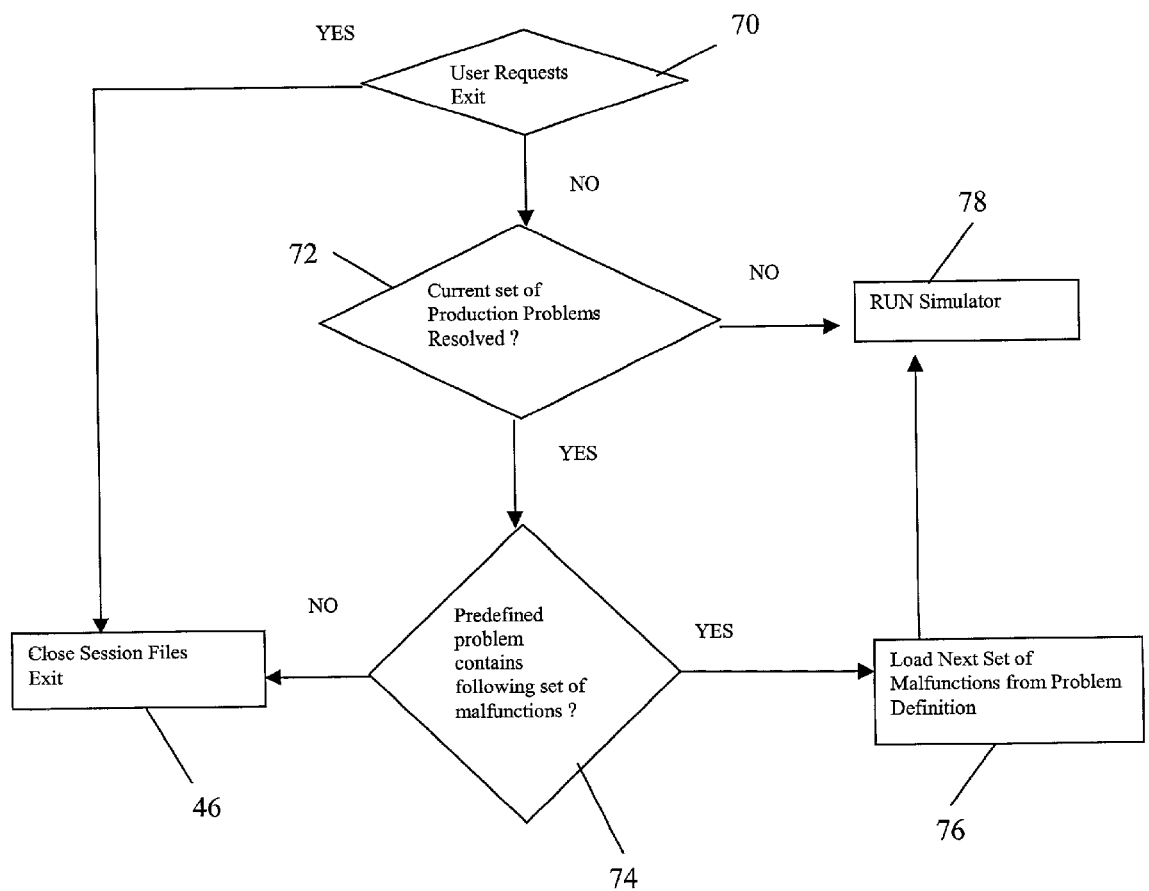
FIG. 5 is a flowchart illustrating the exit conditions for the flexographic printing simulator according to the present invention.

An exit routine for the program is illustrated in the flow chart of FIG. 5. The user can request termination of the simulation 70 in which case the session files are closed and the program exits at block 46. Otherwise, a Problem Solving determination is made as to whether the current set of production problems has been resolved 72, in which case either a predefined problem set 74 will continue to run 76, 78, or the program will exit 46.

Various print display functions and options are shown in FIG. 6. Once the simulated print image has been calculated 80, print display functions are available at block 82. The color plane and materials surface information is updated to include any faults that are determined to have occurred. All color planes and surface information are then recombined to provide the simulated "printed copy." The user can opt to view the full image, or only parts of the image, which can be updated automatically or on-demand. In addition, images at any point in the processing sequence can be obtained, and a "proof" can be displayed and compared side-by-side with the current print.

FIG. 7 details various functions that are provided to assist in quality control inspection of the simulated print 84. For example, a simulated magnifier can be used for closer inspection of print dots, and a simulated spectrophotometer is used to measure CIE L*A*B* and Delta E values. (CIE=Commission Internationale de l'Eclairage: The International Commission on Illumination.) Comparisons also can be made using control strips. In addition, simulated VOC (volatile organic components) readings can be obtained, and a simulated "tape test" can be conducted to measure adhesion. A virtual densitometer also is provided to measure density, dot grain, and trapping. Histories of quality control inspections are archived in the session files 86.

Referring to FIG. 8, preferred user interface 60 routines include control panel interactions for each of the different press types. Available control functions include speeds, temperatures, tension, pressures, and ink values, among others. As discussed further below, user interaction and control also is available for pressroom components and subcomponents. Included in the data supplied and retrieved are economic variables, such as cost and time information. The user also can custom annotate the program by adding multimedia links.

Figure 9:
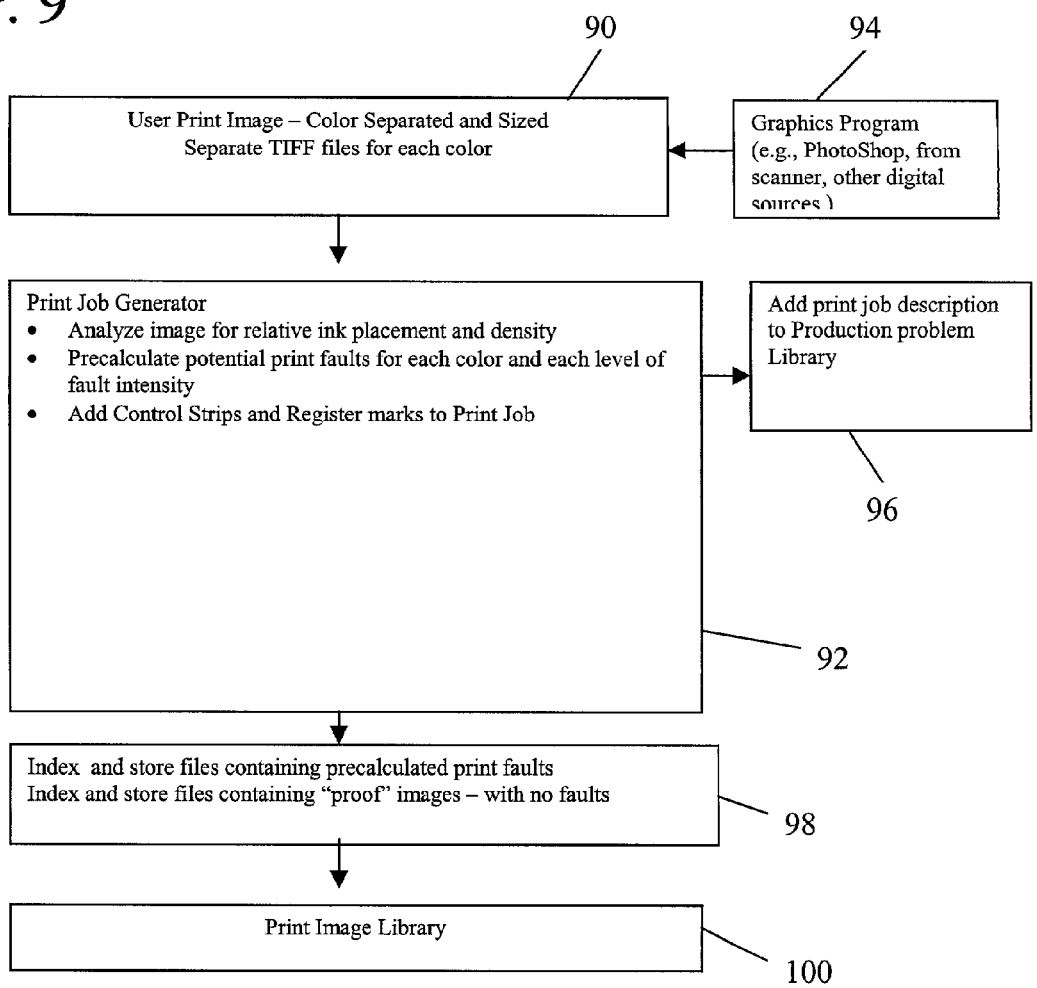
FIG. 9 is a flowchart illustrating print image library functions of a flexographic printing simulator according to the present invention.

Referring to FIG. 9, a set of standard print jobs is available. These have already been pretreated by the Print Job Generator 92 and are ready for use by the Display routines in the simulator. Optionally, a print image can be entered for analysis 90 using a graphics program 94 such as PhotoShop, for example. The program also will precalculate potential print faults for each color and each level of fault intensity. Control strips and register marks also can be added to each print job. A description of the print job is added to a Production Problem Library 96. The precalculated print faults and proof images having no faults are indexed 98 and stored in a Print Image Library 100.

Figure 10:
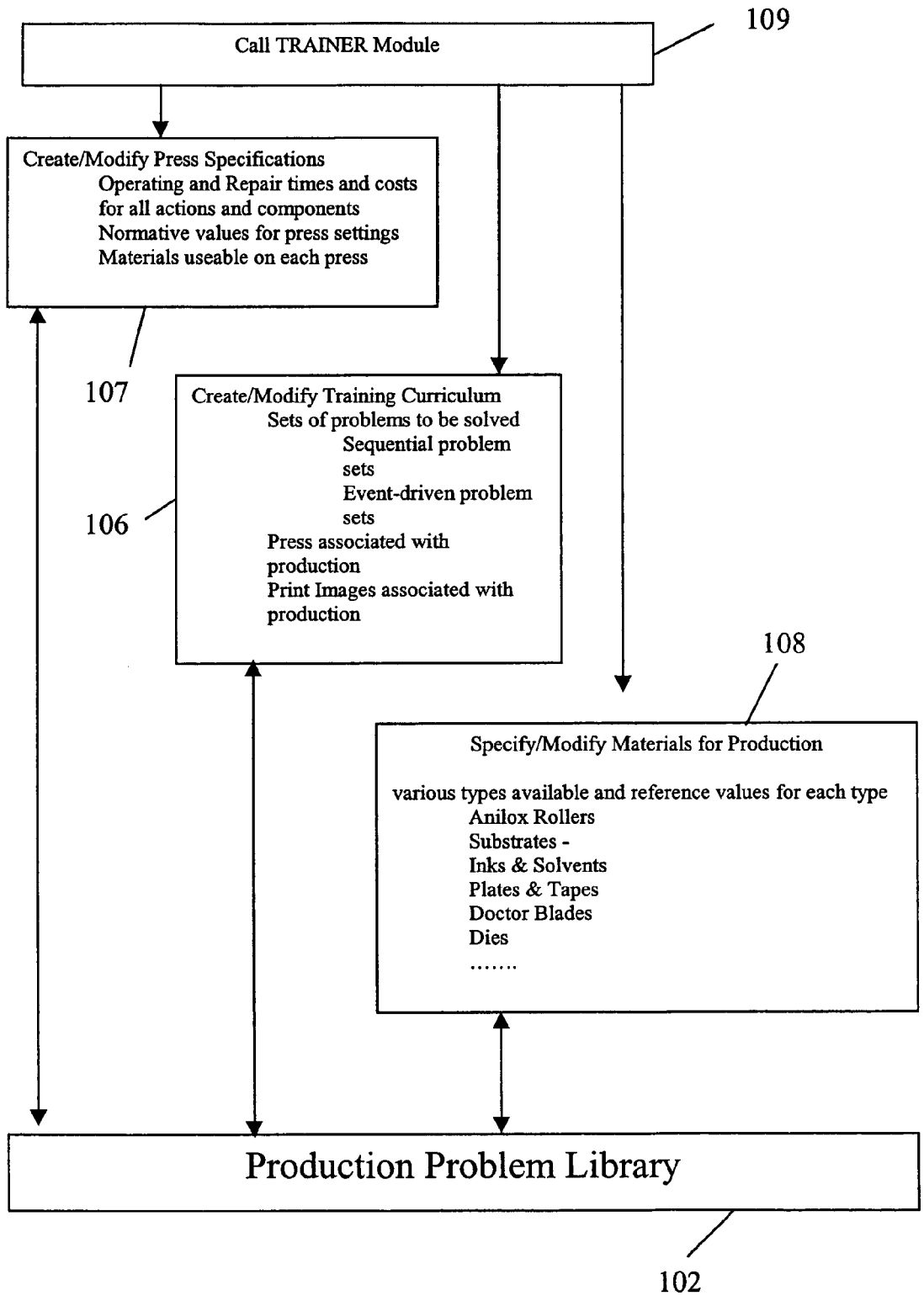
FIG. 10 is a flowchart illustrating the production problem library functions of a flexographic printing simulator according to the present invention.

The Production Problem Library 102 can be used to establish press specification 104, create training curricula 106, create and modify press specifications 107, and to determine materials for production 108, as illustrated in FIG. 10. A trainer module 109, discussed further below, also can access the production problem library through these services.

Figure 12:
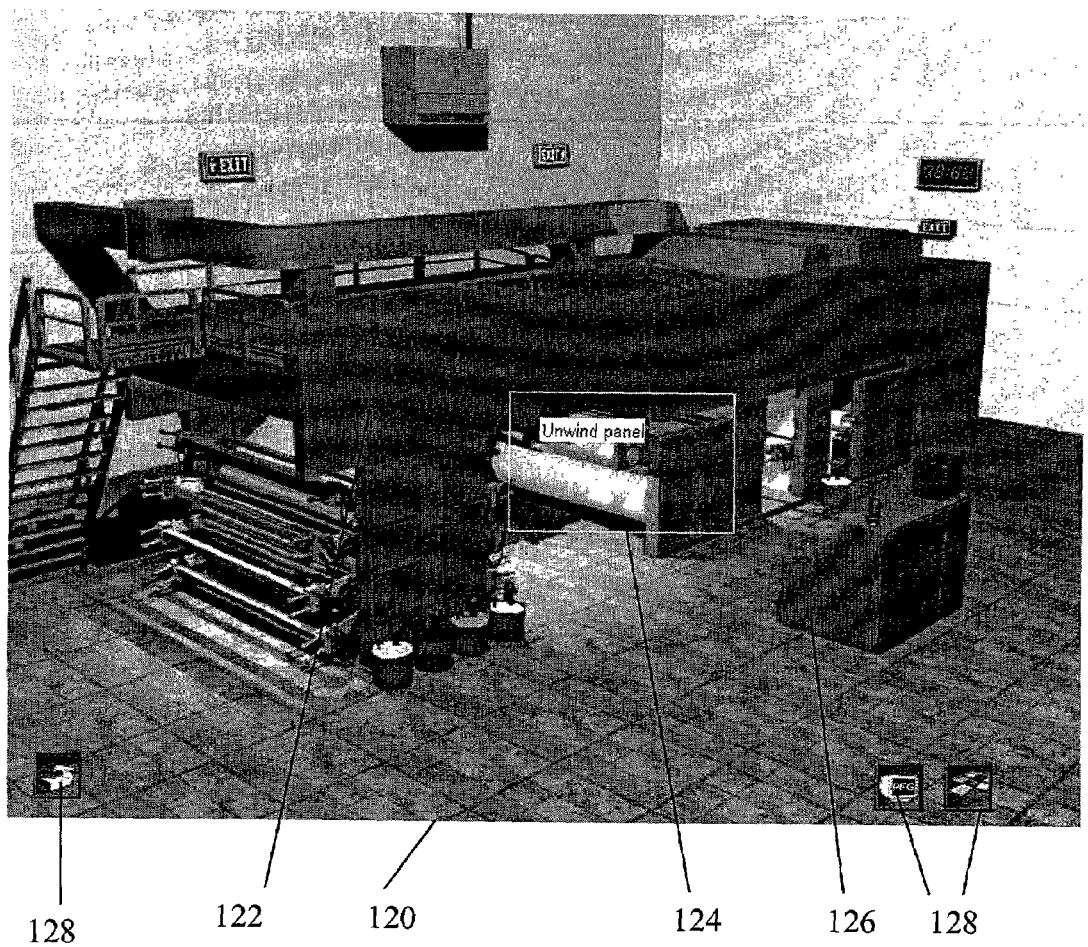
FIG. 12 illustrates a computer graphic model of a virtual flexographic common impression printing press simulated by the flexographic printing simulator according to the present invention.

Proceeding from the initial launch screen 110, the simulation program generates an interactive virtual pressroom view of the type of press chosen. FIG. 12 illustrates the Common Impression Press (CI) Pressroom view 120. The press room is shown in perspective, and each functional component of the press 122 can be interactively accessed by the user in order to verify and adjust settings, or to check and repair mechanical or electrical malfunctions. In FIG. 12, for example, Unwind panel 124 is highlighted for selection of controls specific to its operation. In addition, a control console 126 shown to the right of press 122 lets the user simulate all the normal press operations. Navigational control icons 128 are provided at the bottom of the screen.

Figure 13:
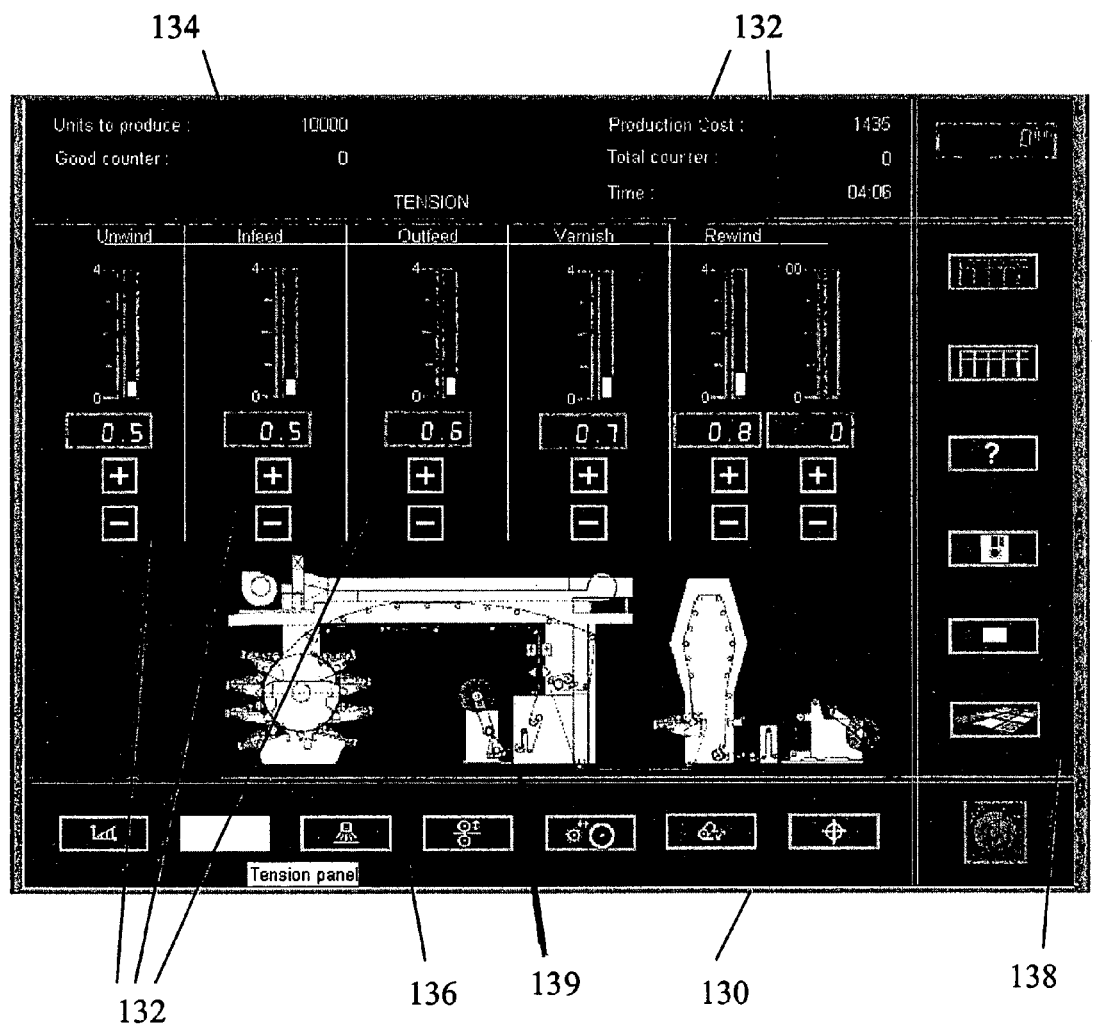
FIG. 13 illustrates a computer screen graphic representing a virtual control console user interface for operating the simulated flexographic printing press of FIG. 12.
Figure 14:
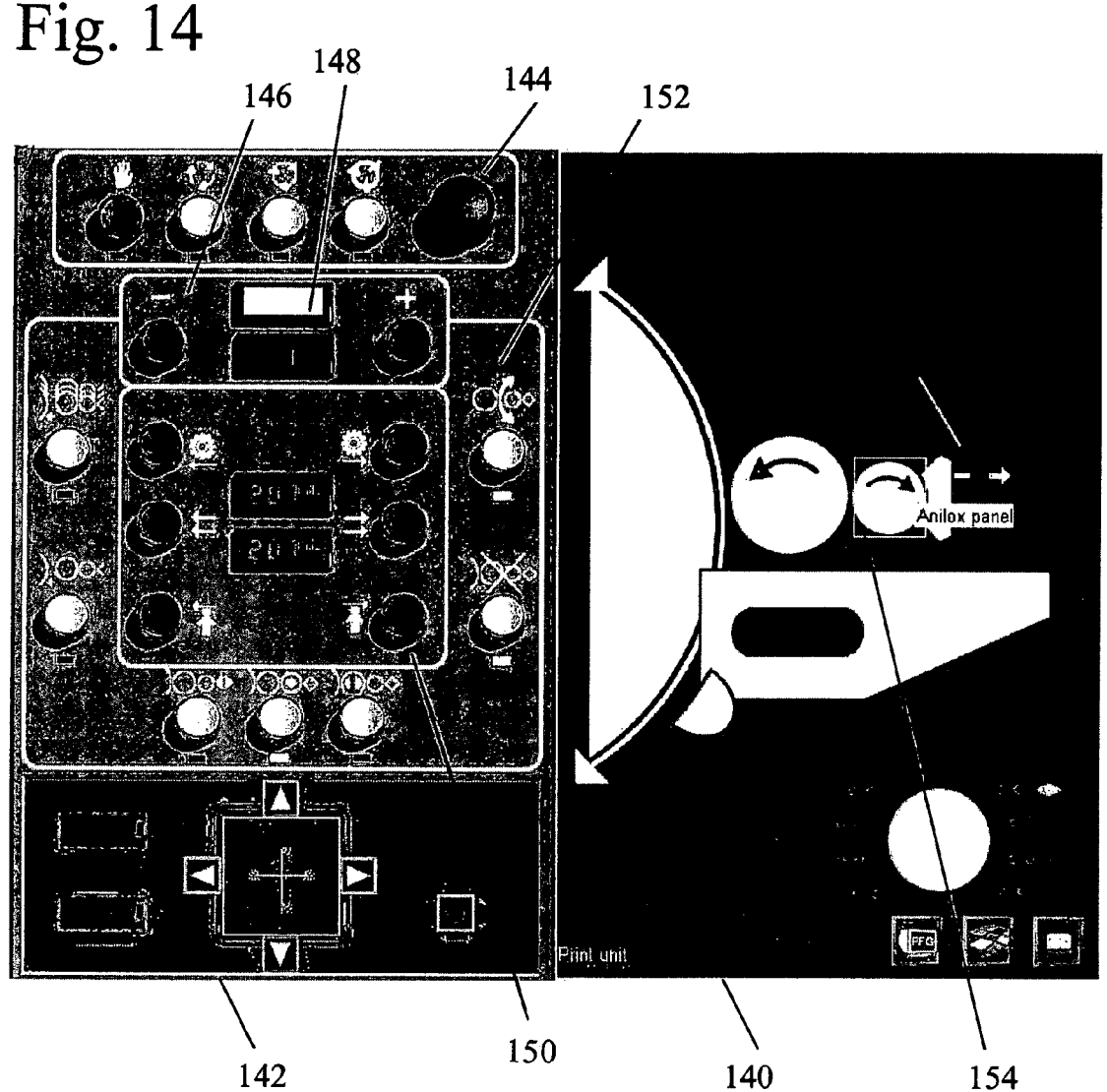
FIG. 14 illustrates a computer graphic model for a print unit and control panel in the common impression press of FIG. 12.
Figure 15:
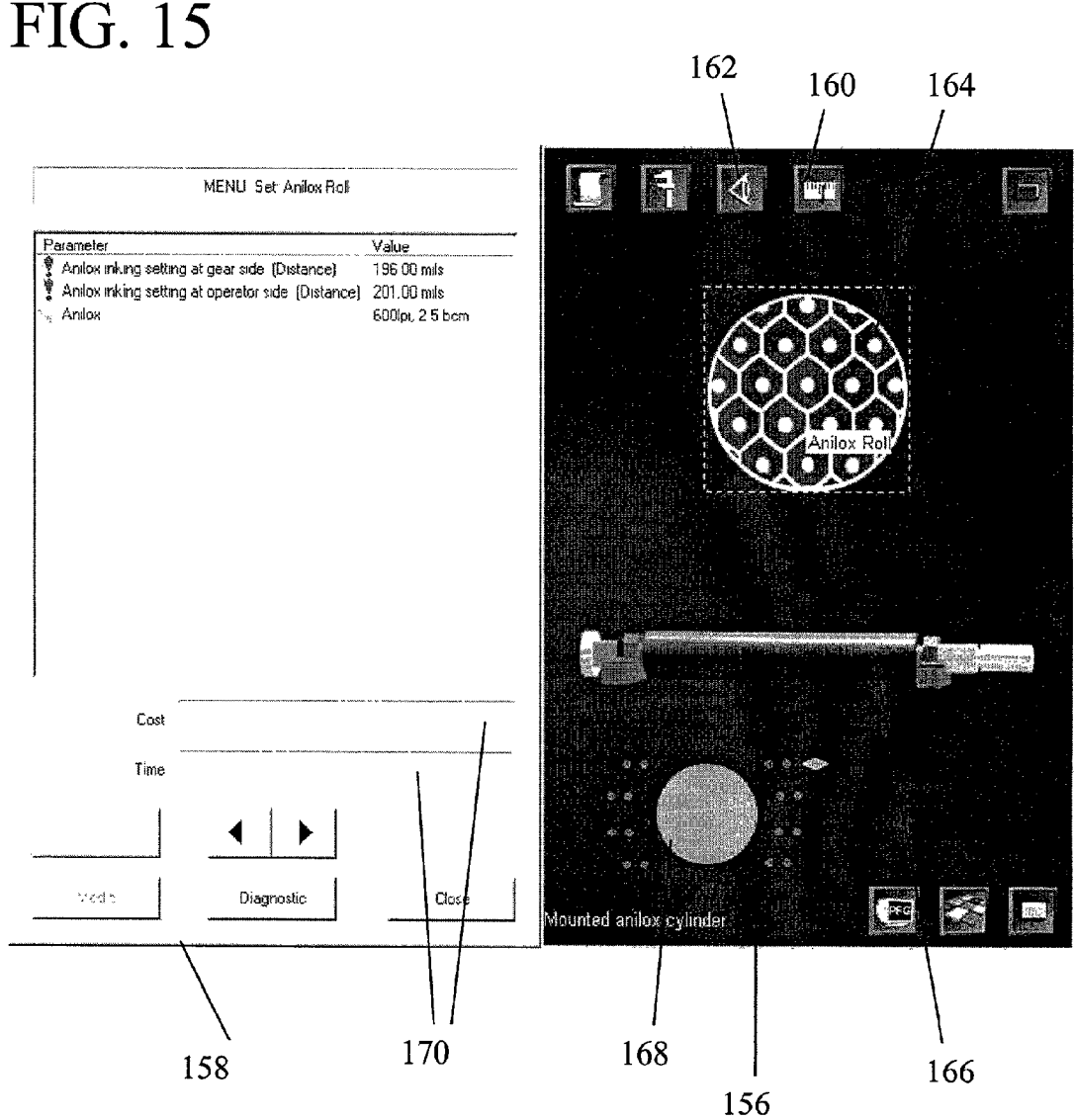
FIG. 15 illustrates a computer graphic model of an anilox roll mechanism within the print unit of FIG. 14.

FIGS. 13–15 illustrate selected representative portions of the control console, print units and, in more detail, a subcomponent of the print unit, an anilox roll assembly, respectively. Although specific mechanical components are shown only for the CI press, they are present for other press types and are represented by the simulation program in the same general manner.

Referring more specifically to FIG. 13, a portion of a Control Console User Interface 130 for the control console 126 of CI Press 122 is shown. This representative part of the control console illustrates virtual controls 132 for adjusting tension of the substrate as it moves through the press. The console also offers control and data readouts 134 of speed, temperature, pressure, job ticket information, and all the other parameters found on a modern console for a CI flexographic press. Other available control options can be selected from panel 136 at the bottom of the screen. Supplementary control icons 138 provide access to help information and program navigation, for example. An elevation view 139 of the CI press provides a reference regarding the materials paths (reading left to right) through the press, which is echoed in the sequence placement of the tension controls on the screen (unwind to rewind).

FIG. 14 illustrates a two panel representation of mechanical component modeling specifically with respect to a Print Unit of the CI press. A press component panel 140 is shown to the right of FIG. 14, alongside the unit control panel 142 on the left. The control panel includes groups of icons arranged for press speed adjustment 144 including Start, Stop, Run, and Jog; a choice of print units (from 1–8) 146, showing the color being printed 148 (e.g., yellow on unit 1); pressure adjustments for ink transfer group (current print unit) 150; and selective control 152 of Doctor Blade/Anilox Roll, Anilox Roll/Plate Cylinder, and Plate Cylinder/Impression Cylinder. Pressure can be adjusted at either end of each component, or globally for the component. Lateral and Circumferential Register adjustments (current print unit) also are provided. In press component panel 140, a subcomponent anilox panel 154 is highlighted for selection and control as discussed in connection with FIG. 15.

FIG. 15 is a two screen representation of the anilox roll control and component screens as linked from the Print Unit of FIG. 14. The anilox roll mechanism itself has further subcomponents such as shafts, seals, etc. (not shown) that can be accessed from the component screen 156 shown on the right of FIG. 15 to provide detailed virtual control of the selected press. Menu control screen 158 is shown on the left. The icons in the upper portion of the anilox roll component screen 156 allow the user to choose which type of information or action they wish to display or modify using the control screen 158. Accordingly, the user can set values 160

(the current choice), visually control the state of the component 162, or take other measures. Graphical representations of the anilox roll include a detailed view 164, a perspective view 166, and an end view 168.

The control screen 158 shows a menu of the process variables (the subset available to the user) related to this component, with current value and an indication whether or not the current value matches the recommended production value. The cost and time fields 170 at the bottom of the menu screen are used to inform the user of the time and out of pocket cost of verifications or actions used to solve production problems. Thus, the user can calculate the virtual production cost for the session. Both screens also include various additional icons for program navigation and control.

Figure 16:
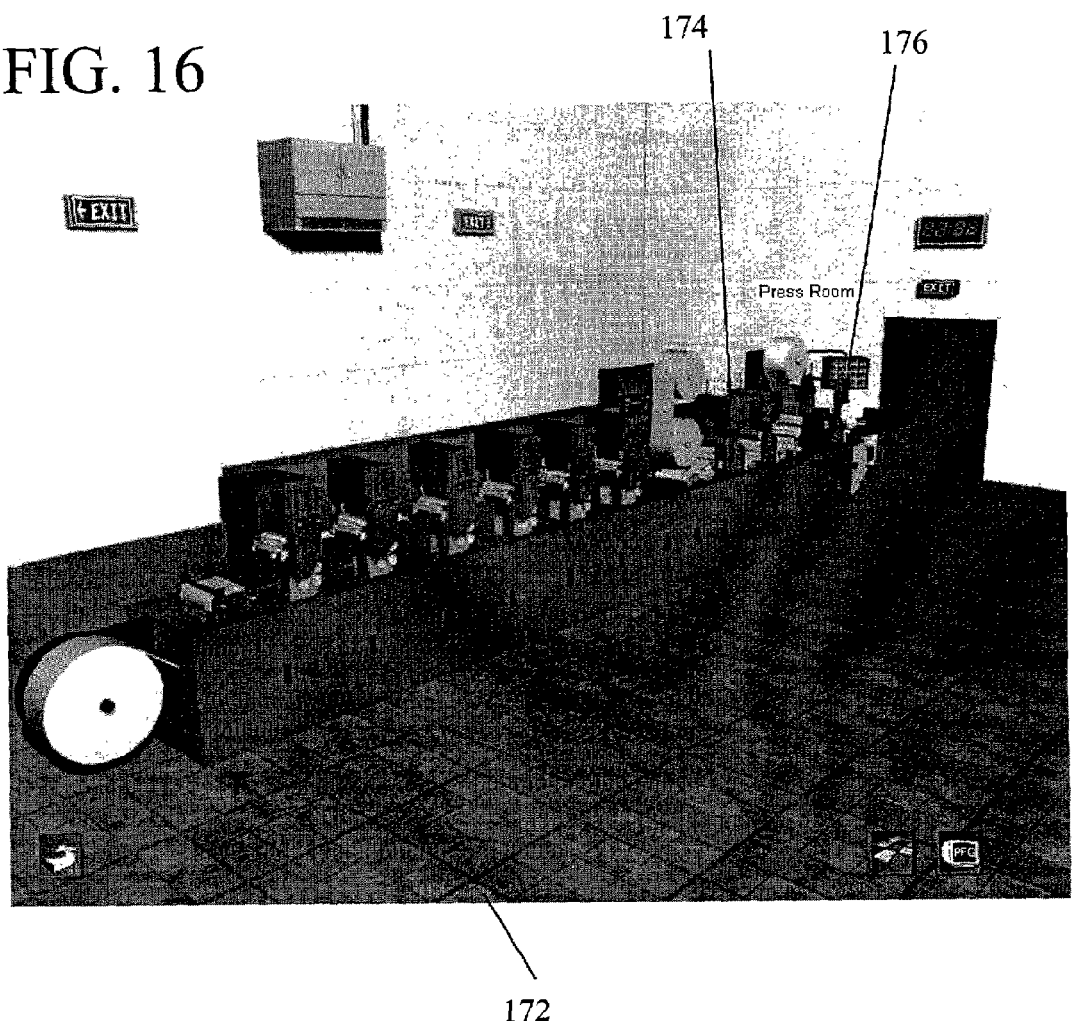
FIG. 16 illustrates a press room view of a computer graphic model for an in line press according to the present invention.

Referring to FIG. 16, a pressroom view 172 of an IL (In Line) press is shown according to the present invention. IL (also called "narrow web") presses are used for printing labels or folded cartons. Similar to the CI press described above, virtual IL press 174 and control console 176 are shown in an interactive, perspective view interface after selection of the IL press from initial launch screen 110 shown in FIG. 11.

Figure 17:
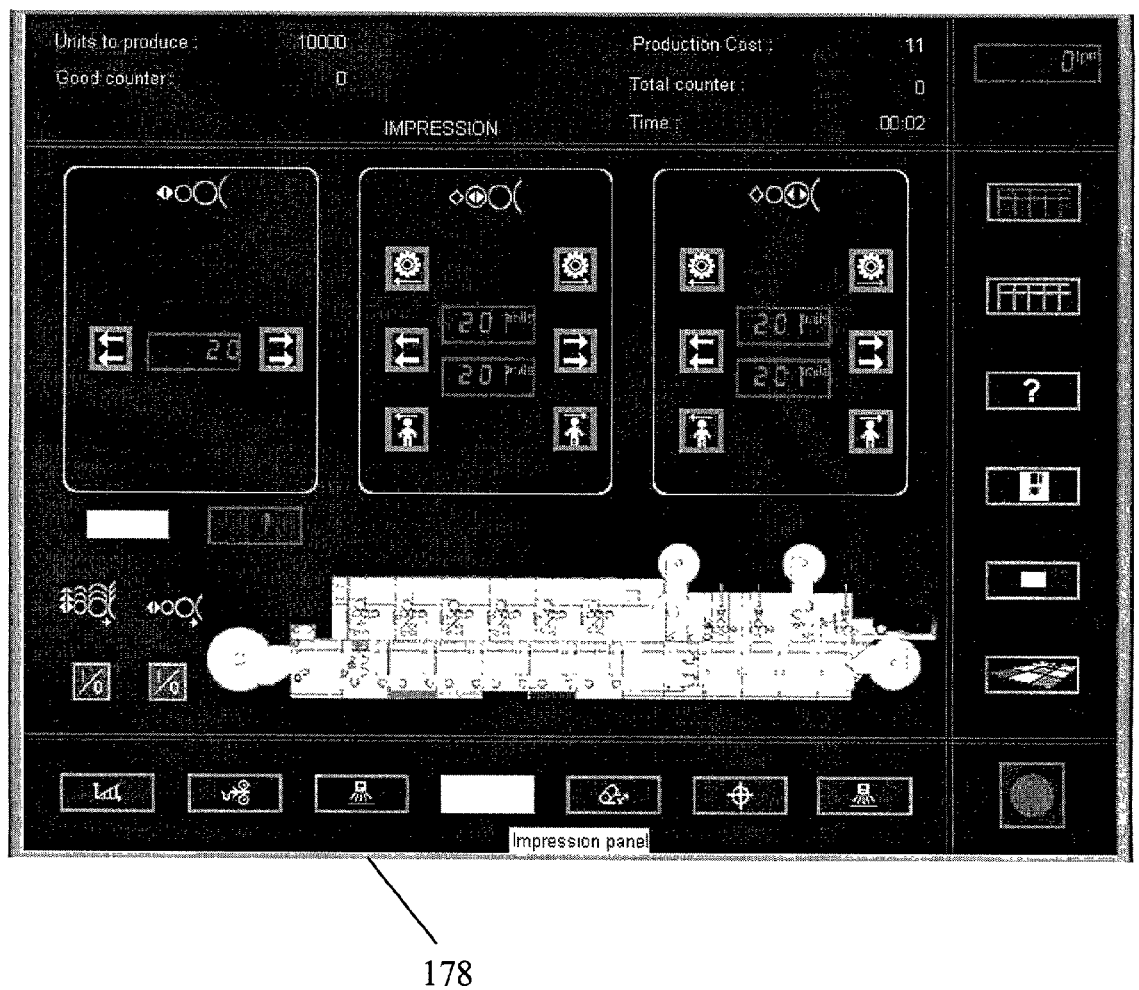
FIG. 17 illustrates a computer graphic model of a control console user interface of the press model of FIG. 16.

An example of a control screen interface that is accessible from IL press control console 176 is shown in FIG. 17, in which a view of the Impression control panel 178 has been selected by the user. An array of virtual control icons is presented that are specifically adapted for control of the virtual IL press 174.

Figure 18:
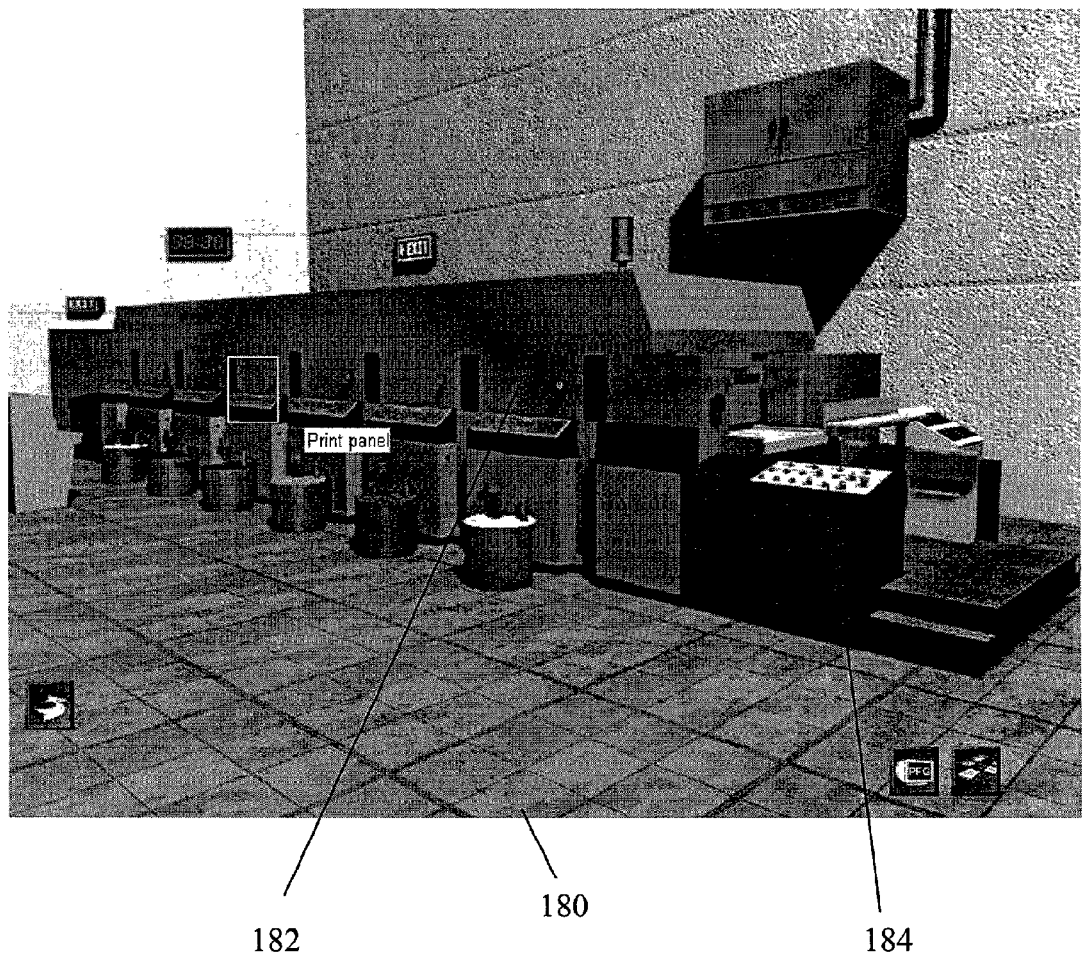
FIG. 18 illustrates a press room view of a computer graphic model for a corrugated press according to the present invention.
Figure 19:
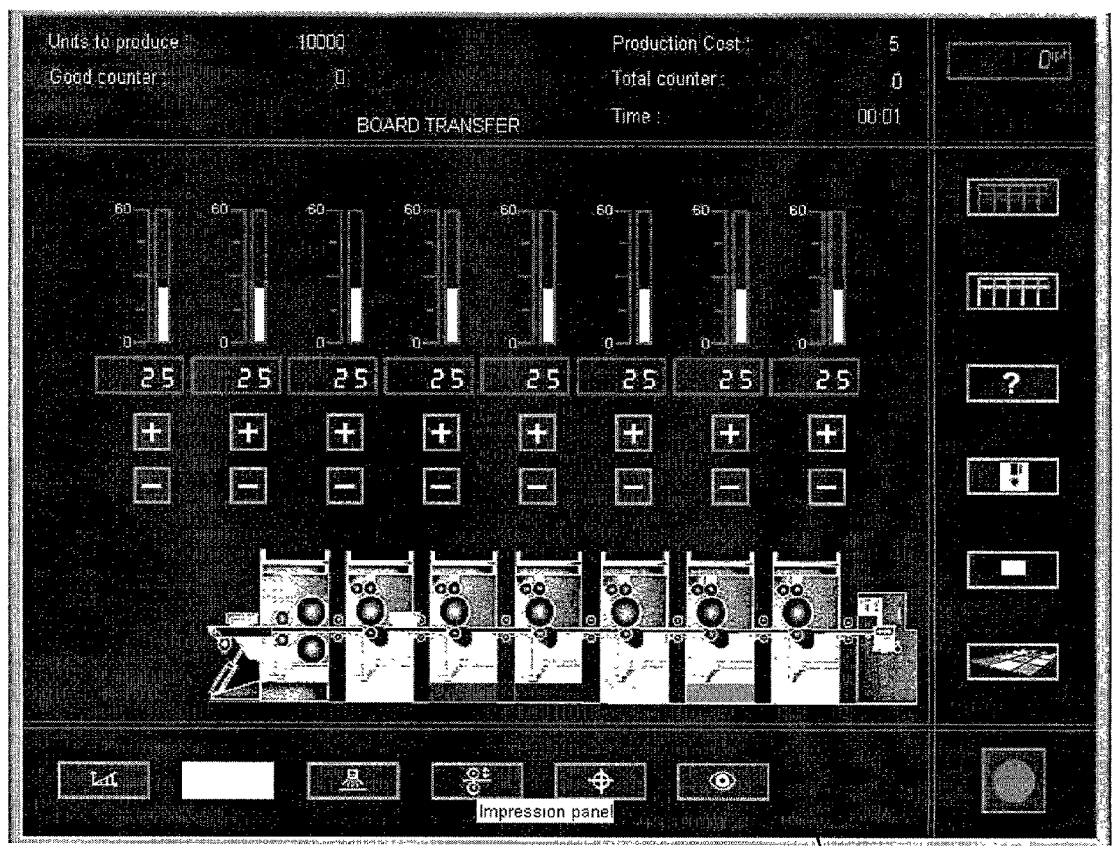
FIG. 19 illustrates a computer graphic model of a control console user interface of the press model of FIG. 18.

FIG. 18 illustrates a virtual CS (Corrugated Sheet) pressroom 180. Corrugated sheet presses generally are used to print corrugated boxes. The pressroom view again includes an interactive perspective view of a CS press 182 and a control console 184. A print panel is highlighted for selection. A control screen 186 for the CS press is shown in FIG. 19, a board transfer control panel having been selected by the user.

Figure 20:
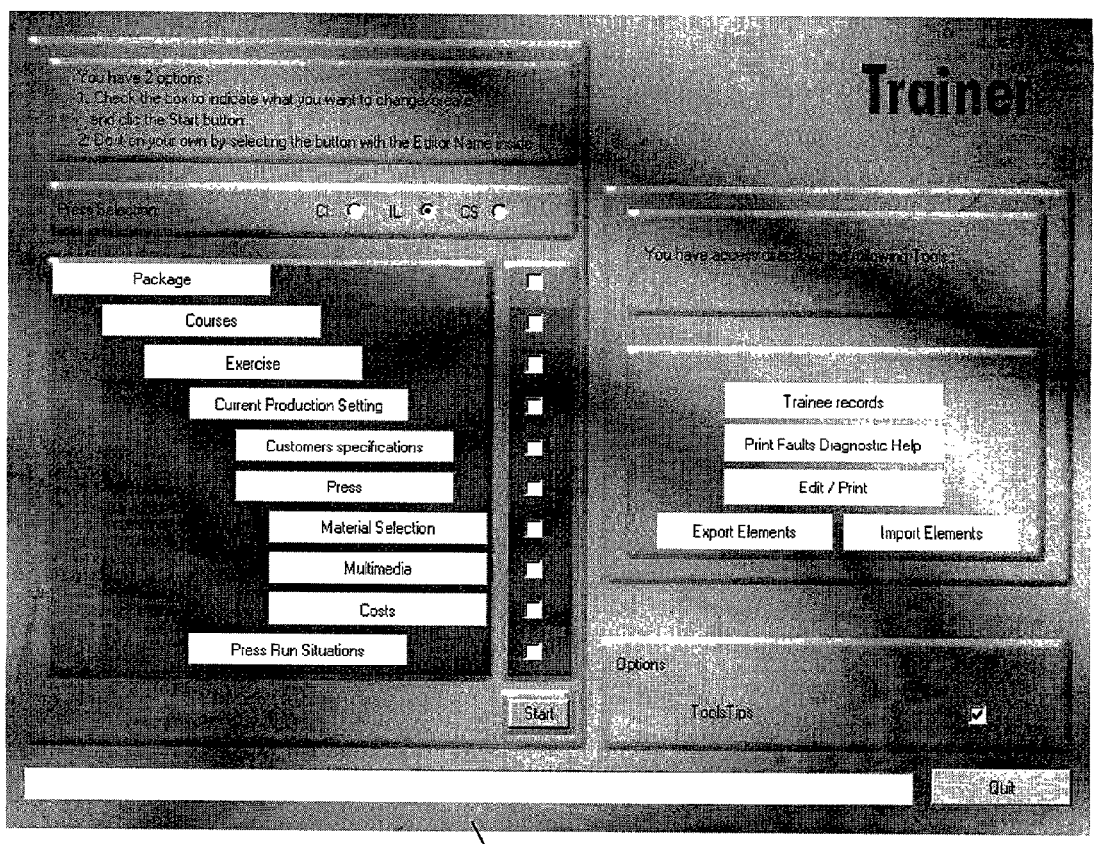
FIG. 20 illustrates a training module interface screen for a flexographic printing simulator according to the present invention.

An interface screen 188 that provides access to the trainer module of the present invention is shown in FIG. 20. The trainer module lets the user specify and modify the production problem library discussed above in connection with FIGS. 3 and 10. The production problem library covers the way the press and materials are chosen. It also includes the training exercises that make up a curriculum.

From the Trainer module screen 188, it also is possible to access the session files which record how each user has done when trying to solve the simulated production problems.

Figure 21:
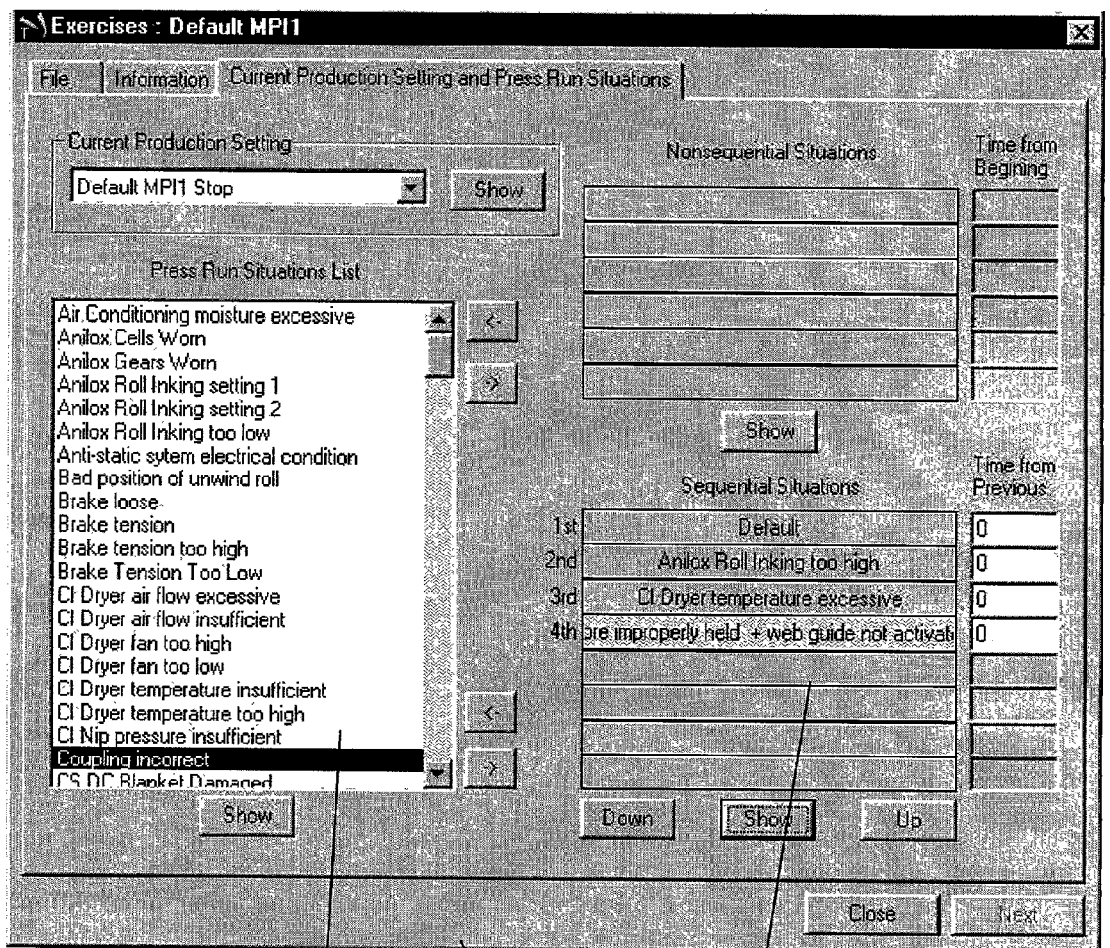
FIG. 21 illustrates a curriculum development screen for a flexographic printing simulator according to the present invention.

Referring to FIG. 21, an example is shown of training exercise screen 190 in which a process problem to be included in a sequential problem set is presented. Screen 190 is one part of a curriculum development module of the simulator. The Press Situation List 192 on the left of the screen contains definitions of potential process problems. The trainer chooses which of these will be included in the current set of Sequential Situations 194 being defined. Once the set of problems has been defined, the set will be given a name and stored in the Production Problem Library. It is thus possible to make problem sets in a range of difficulty, from simple to complex.

Figure 22:
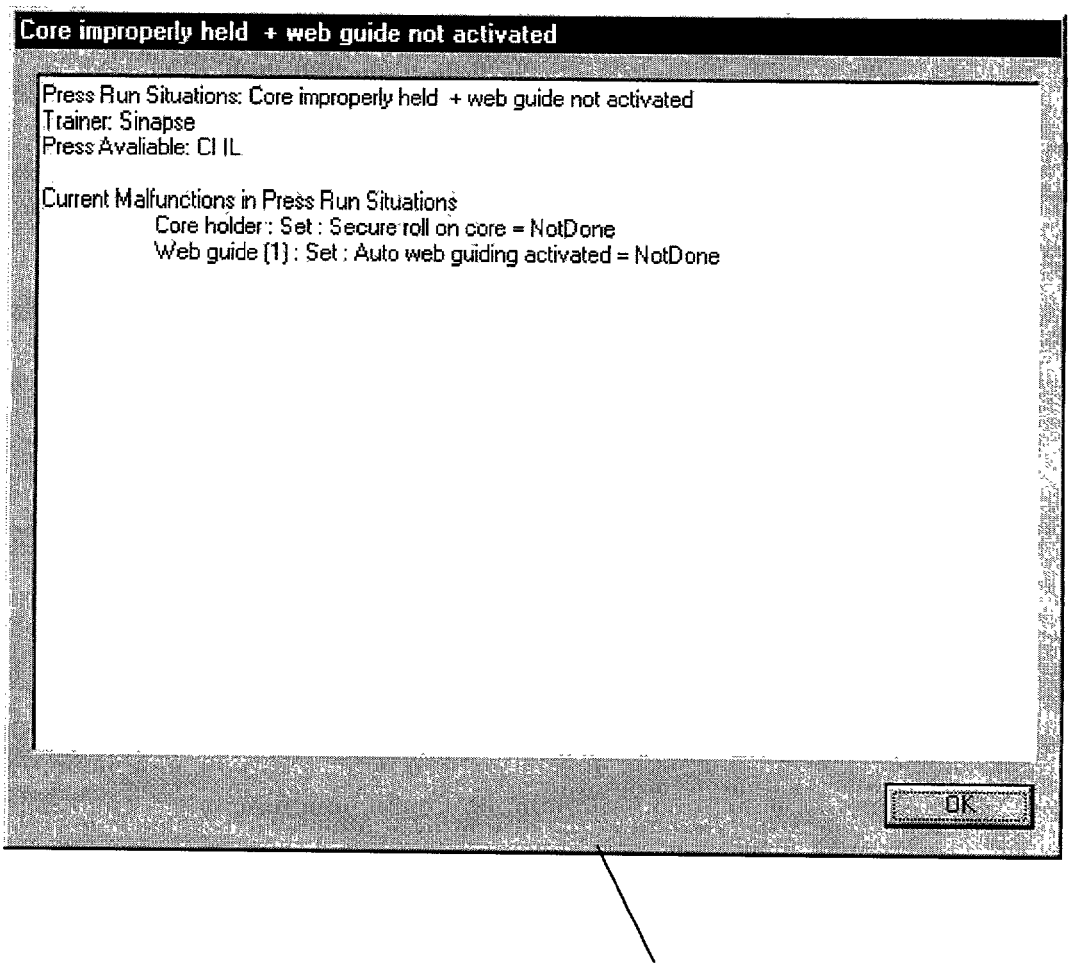
FIG. 22 illustrates a problem specification screen detailing process problems included in a simulated training exercise according to the present invention.

FIG. 22 illustrates a situation screen 196 showing details of how problems in a run specification will effect parameters of the simulated press. The screen image shows the details of one of the process problems being included in a training exercise. Illustrated are values for initial process variables (Core Holder Roll Secure, and Web Guide Activating) that will be initialized as being incorrect. This will cause problems with the process which will be visible on the process output (the printed product).

Figure 23:
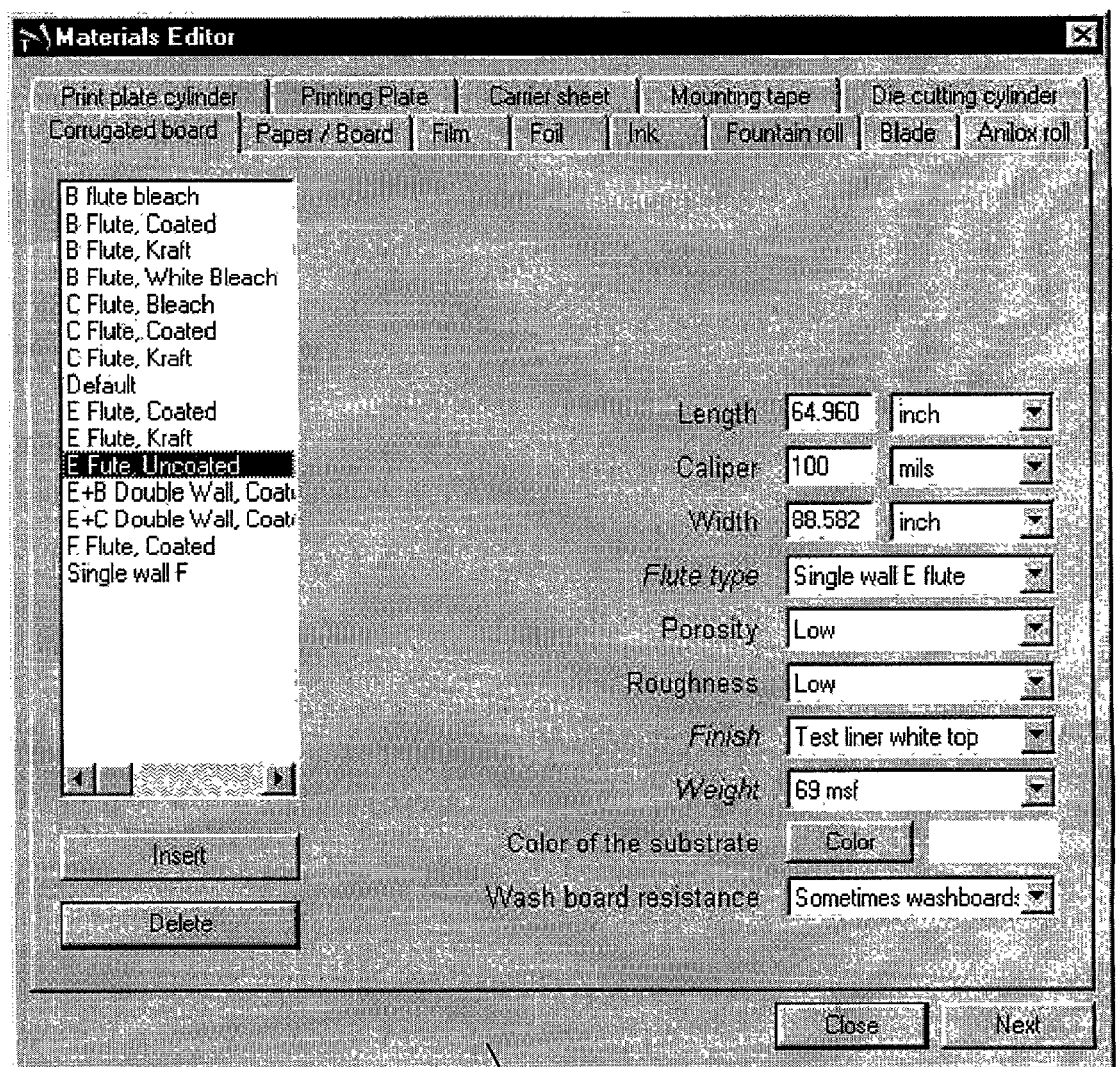
FIG. 23 illustrates a material editor user interface provided by a flexographic printing simulator according to the present invention.

Referring to FIG. 23, a materials editor screen 198 is shown whereby the user can specify various types and values of pressroom materials for use in the simulated pressroom. Using the materials editor, different production sites can adapt the simulator to reflect their "best practice."

Figure 24:
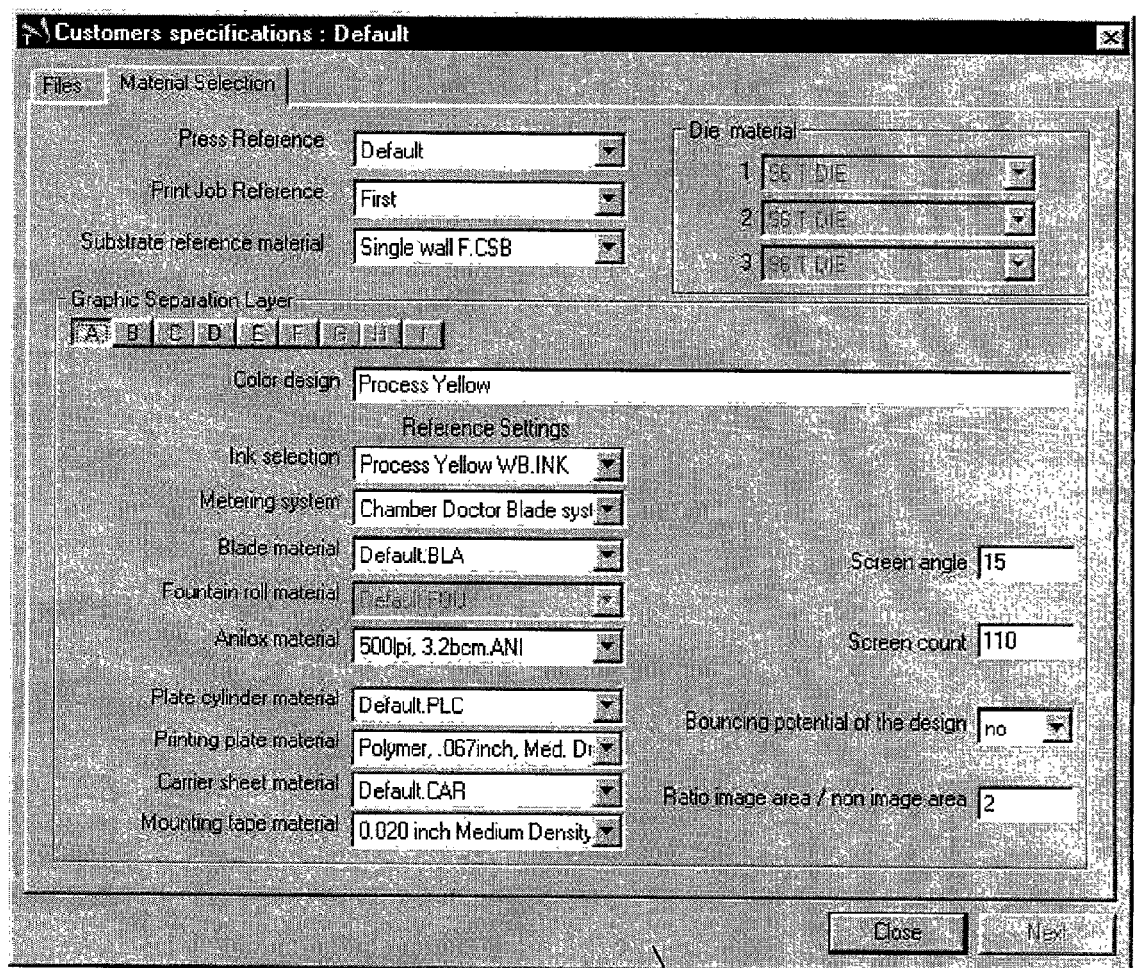
FIG. 24 illustrates a press editor user interface according to the present invention.

Further parameters are set using the customer specifications screen 200 shown in FIG. 24, which accepts values for each color printed in each graphic separation layer. Users can set up the virtual presses for the simulated production run in the same manner as they prepare presses for real production. For each print unit the user decides what materials will be used. The wrong choices—or choices of incompatible materials—will cause process problems.

Once problem sets have been defined, they are placed in a library. Users can access the appropriate problem set from the library using an access screen 202 shown in FIG. 25. The library structure includes Packages, Courses, and Exercises. Packages (e.g., for CI presses) contain different Courses; Courses contain exercises. Each course focuses on a different subject; and the exercises contain many different process problems. The user is expected (but not obliged) to enter their name so the session can be evaluated at a later date.

Figure 26:
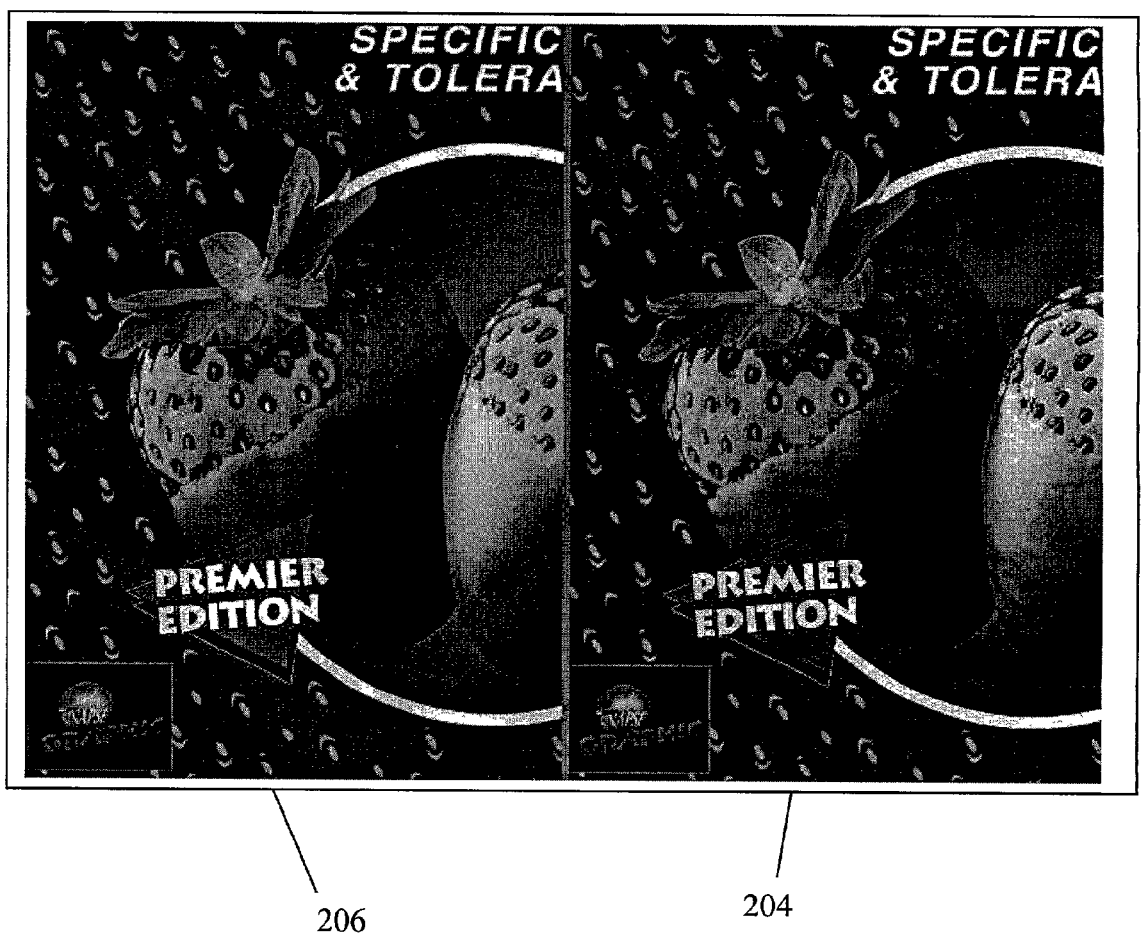
FIG. 26 illustrates sample images from a print display module of a flexographic press simulator according to the present invention.

FIG. 26 illustrates sample images from a print display module. On the right of FIG. 26 is a "proof" image 204; the left-hand side shows a current print 206. The proof differs from the current print as the result of too little pressure on the yellow plate cylinder, which is revealed by a flaw in coloring of the words "PREMIER EDITION." As the process conditions are modified the print images generated by the simulator are modified in real time. The images can be inspected and measured with simulated analysis tools such as densitometers, spectrophotometers, magnifiers, etc. The measurements from the proof are compared to those from the print in an effort to analyze the potential problem and its causes.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for simulating a flexographic printing process based on user-controlled flexographic printing process parameters, the system comprising:
   a set of data bases comprising a formal model of flexographic printing including flexographic printing process variables, ranges of the flexographic printing process variable values, potential interactions between the flexographic printing process variables, and effects of the potential interactions on a flexographic printing process output;
   a simulator program comprising a dynamic model of the flexographic printing process; and
   a user interface for providing user control of the simulator program.

2. The system of claim 1, wherein the user interface simulates a pressroom, including flexographic printing and control systems in the pressroom.

3. The system of claim 1, further comprising a copy desk for reproducing the flexographic printing process output.

4. The system of claim 3, wherein the copy desk comprises a set of software routines for performing image manipulations in order to reproduce printed effects on the flexographic printing process output, including changes in size of dots, dot density, and modifications to a substrate surface.

5. The system of claim 4, wherein the copy desk further comprises printer's diagnostic tools including at least one of a densitometer, a magnifier, and a spectrophotometer.

6. The system of claim 1, further comprising a trainer module for allowing a user to specify sets of materials to be used in the flexographic printing process.

7. The system of claim 6, wherein the user can define production costs applied in the simulator.

8. The system of claim 6, wherein the user can create problem sets which become a curriculum of a flexographic printing training course.

9. The system of claim 1, further comprising a copy generator module that allows users to enter images as simulated production jobs.

10. The system of claim 9, wherein the copy generator module analyzes an image and pre-calculates how certain process faults would look if they were to appear on the image.

11. The system of claim 1, further comprising a diagnostic help system module for presenting the databases to help users troubleshoot flexographic print problems.

12. The system of claim 1, wherein the user interface lets a user verify and act on flexographic printing press and flexographic printing process parameters, the actions and verifications being communicated to the simulator.

13. A method of simulating a flexographic printing process based on user-controlled flexographic printing process parameters, the method comprising the steps of:
creating a database containing a formal model of the flexographic printing process;
providing a computerized workstation for accessing the database, accepting input from a user by way of a user interface, and displaying data related to flexographic printing process simulation;
processing flexographic printing data entered on the workstation using a dynamic flexographic printing model to generate flexographic printing simulation data; and
displaying the flexographic printing simulation data.

14. The method of claim 13, further comprising the step of generating trace files of the process steps.

15. The method of claim 13, further comprising the step of providing user-definable multimedia links to data outside the database.

16. The method of claim 13, wherein the user interface comprises a flexographic printing press console.

17. The method of claim 13, further comprising the step of providing image manipulation screens to the user, including manipulations to "dot" size, density, and substrate surface.

18. The method of claim 13, further comprising the step of simulating flexographic printer diagnostic tools, including densitometers, magnifiers, and spectrophotometers.

19. The method of claim 13, further comprising providing a trainer module for specifying sets of materials and reference values to be used for flexographic printing production runs.

20. The method of claim 13, further comprising calculating flexographic printing production costs.

21. The method of claim 13, further comprising providing a copy generator module into which an image is entered and the image is analyzed to anticipate potential flexographic printing production faults.

22. A system for simulating a flexographic printing operation comprising:
a database for storing parameters relating to flexographic printing operations;
a formal model for relating input data to the database;
a user input for interactively eliciting flexographic printing input data from a user;
a simulating system based on a dynamic flexographic printing model for producing simulated flexographic printing output data based on the formal flexographic printing model; and
a display for presenting the simulated flexographic printing output data to the user.

* * * * *